(12) United States Patent
Chang et al.

(10) Patent No.: US 7,566,863 B2
(45) Date of Patent: Jul. 28, 2009

(54) OPTICAL ENCODER WITH DIFFRACTIVE ENCODER MEMBER

(76) Inventors: Christopher C. Chang, 1851 Toulouse La., Brentwood, CA (US) 94513;
Bernard C. Kress, 1 Rue Saint Bernard, 67350 Neubourg (FR)

( * ) Notice: Subject to any disclaimer, the term of this patent is extended or adjusted under 35 U.S.C. 154(b) by 0 days.

(21) Appl. No.: 11/969,866

(22) Filed: Jan. 4, 2008

(65) Prior Publication Data
US 2008/0100849 A1    May 1, 2008

Related U.S. Application Data

(63) Continuation-in-part of application No. 11/581,810, filed on Oct. 16, 2006.

(51) Int. Cl.
*G01D 5/34* (2006.01)

(52) U.S. Cl. .................................. 250/231.13
(58) Field of Classification Search ................................. 250/231.13–231.18
See application file for complete search history.

(56) References Cited

U.S. PATENT DOCUMENTS 5,260,568 A * 11/1993 Ieki ........................ 250/231.18
6,654,128 B2 * 11/2003 Takayama et al. ........... 356/499

* cited by examiner

*Primary Examiner*—Thanh X Luu
(74) *Attorney, Agent, or Firm*—Wilson & Ham; Thomas H. Ham

(57) ABSTRACT

An optical encoder uses an encoder member with a digital diffractive track to optically manipulate an incident beam of light into manipulated beams of light, which are detected as spots of light that represent a digital absolute position value of the encoder member.

12 Claims, 7 Drawing Sheets

OPTICAL ENCODER WITH DIFFRACTIVE ENCODER MEMBER

CROSS REFERENCE TO RELATED APPLICATION

This application is a continuation-in-part of application Ser. No. 11/581,810, filed Oct. 16, 2006, which is incorporated herein by reference.

BACKGROUND OF THE INVENTION

Optical encoders use optical signals to detect mechanical positions and motions in various types of systems. The mechanical positions and motions detected by optical encoders can be related to linear or rotational displacements of moveable components, such as shafts of motors. There are two common types of optical encoders, absolute position encoders and incremental encoders. Both types of optical encoders can determine mechanical positions and motions. The absolute position encoders can determine the exact mechanical position at any moment of operation, even at power-up. The incremental encoders, on the other hand, lose the existing position data at power-down, and cannot determine the exact mechanical position at power-up. However, the incremental encoders are less expensive and require less processing power than the absolute position encoders. Thus, the incremental encoders enjoy a greater market share than the absolute position encoders.

As shown in FIG. 1, a conventional incremental optical encoder 100 typically includes a light source 102, a mask plate 104, an opaque encoder member 106, a pair of optical detectors 108A and 108B and a processor 110. The encoder member 106 includes a first track 112A of small openings 114A and a second track 112B of small openings 114B. The encoder member 106, which is shown in FIG. 1 as a rotary disk, is positioned between the light source 102 and the two optical detectors 108A and 108B.

In operation, the light source 102 emits a beam of light through the mask plate 104, which shapes the beam of light into an elongate beam of light along the Y-direction. The elongate beam of light then strikes the tracks 112A and 112B. As the encoder member 106 is rotated, some of the beam of light is transmitted through the small openings 114A on the track 112A and received by the photodetector 108A, while some of the beam of light is transmitted through the small openings 114B on the other track 112B and received by the photodetector 108B. The photodetectors 108A and 108B generate electrical signals in response to the received light. As shown in FIG. 1, the openings 114A on the track 112A and the openings 114B on the track 112B are offset from each other so that the optical detectors 108A and 108B generate quadrature signals when the encoder member 106 is rotated. The quadrature signals are transmitted to the processor 110, which can process the signals to determine the speed, direction and/or position of the encoder member 106.

A concern with the conventional incremental encoder 100 is that the rotary disk 106 with the openings 114A and 114B on the tracks 112A and 112B is relatively expensive to manufacture, which is reflected in the overall cost of the encoder. Another concern is that the encoder 100 is limited with respect to detecting small positional changes of the rotary disk 106, which depends on the spacing of the openings 114A and 114B on the tracks 112A and 112B.

In view of these concerns, there is a need for a cost-effective incremental optical encoder with greater sensitivity with respect to detection of small positional changes.

SUMMARY OF THE INVENTION

An optical encoder uses an encoder member with a digital diffractive track to optically manipulate an incident beam of light into manipulated beams of light, which are detected as spots of light that represent a digital absolute position value of the encoder member. The encoder member can be made of a plastic material using, for example, compact disc (CD) injection molding technology, which can significantly reduce the overall cost of the optical encoder.

An optical encoder in accordance with an embodiment of the invention comprises a light source, an encoder member and an optical detection system. The light source is configured to generate a beam of light along an original propagating direction. The encoder member is positioned to receive the beam of light from the light source. The encoder member includes a digital diffractive optic track. The digital diffractive optic track is configured to optically manipulate the beam of light into a particular combination of manipulated beams of light from a plurality of combinations of manipulated beams of light as the encoder member is displaced with respect to the light source. Each of the combinations of manipulated beams of light represents a position of the beam of light on the digital diffractive optic track. The optical detection system is positioned to receive and detect the manipulated beams of light from the digital diffractive optic track of the encoder member as spots of light that represent a digital absolute position value of the encoder member.

An encoder member for an optical encoder in accordance with an embodiment of the invention comprises a substrate and a digital diffractive optic track. The digital diffractive optic track is configured to optically manipulate an incident beam of light into a particular combination of manipulated beams of light from a plurality of combinations of manipulated beams of light. Each of the combinations of manipulated beams of light represents a position of the incident beam of light on the digital diffractive optic track.

Other aspects and advantages of the present invention will become apparent from the following detailed description, taken in conjunction with the accompanying drawings, illustrated by way of example of the principles of the invention.

DETAILED DESCRIPTION

Figure 1:
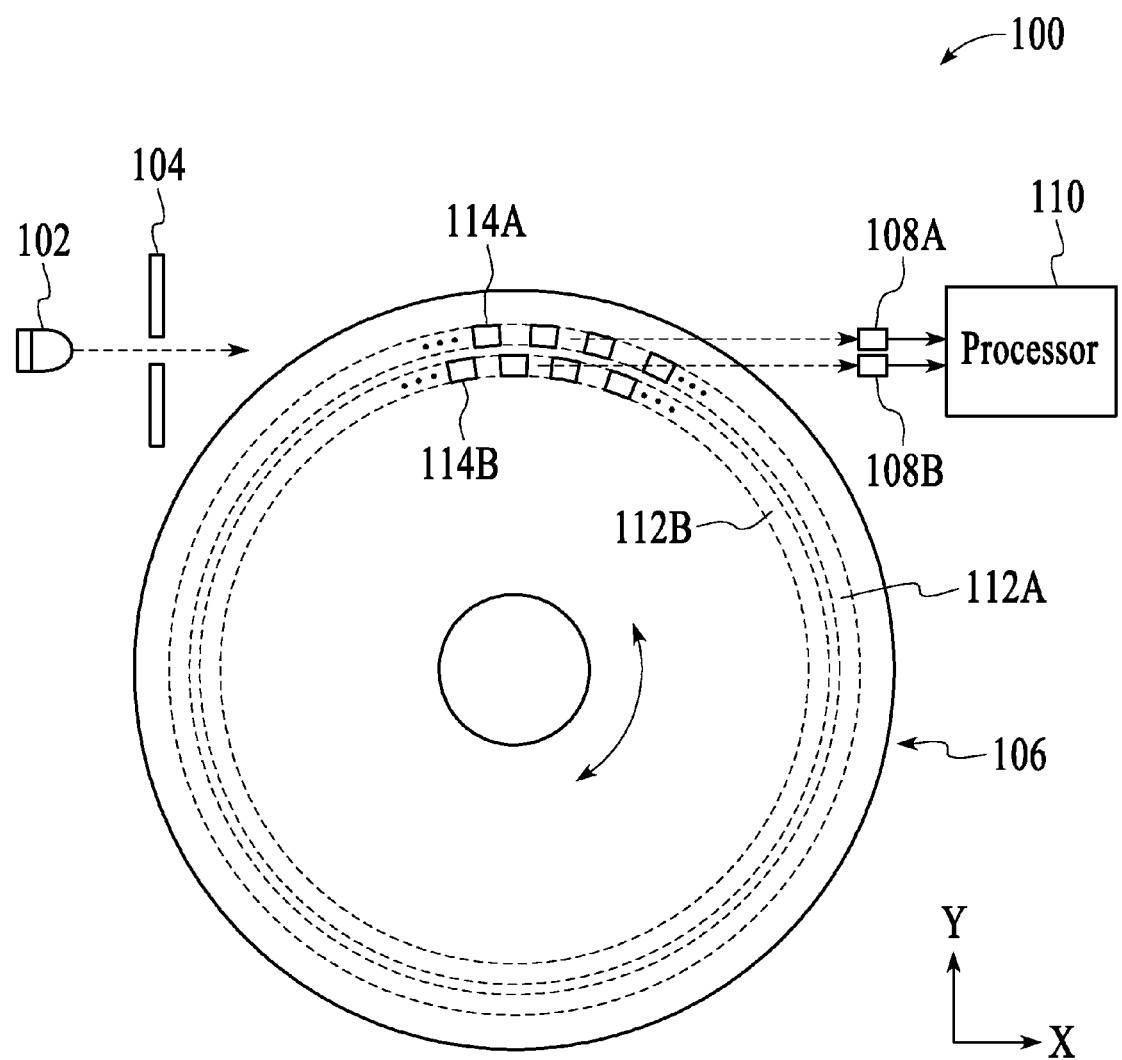
FIG. 1 is a diagram of an incremental optical encoder in accordance with the prior art.
Figure 2:
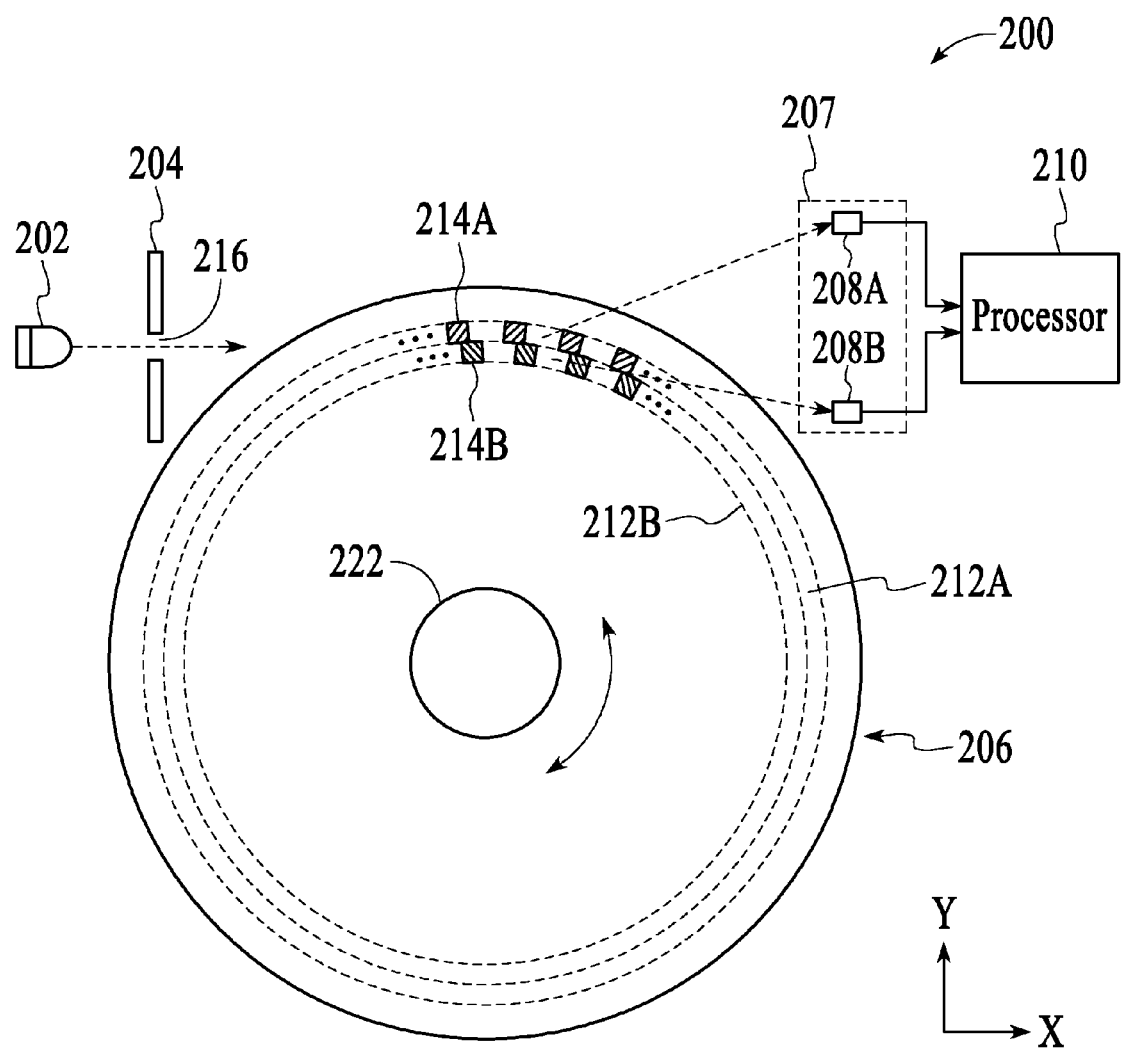
FIG. 2 is a diagram of an incremental optical encoder in accordance with an embodiment of the invention.

With reference to FIG. 2, an incremental optical encoder 200 in accordance with an embodiment of the invention is shown. As described in more detail below, the optical encoder 200 utilizes an encoder member 206 having one or more tracks of digital diffractive optic regions 214A and 214B, rather than an opaque encoder member having one or more tracks of openings used in a conventional incremental optical encoder. As a result, the manufacturing cost of the encoder member 206 is significantly less than the conventional encoder member, which reduces the overall cost of the optical encoder 200. In this embodiment, the optical encoder 200 is a rotary type encoder. However, in other embodiments, the optical encoder 200 may be a different type of encoder, such as a linear type encoder.

As shown in FIG. 2, the optical encoder 200 includes a light source 202, a mask plate 204, the encoder member 206 in the form of a circular disk, an optical detection system 207 and a processor 210. The light source 202 is configured to generate a beam of light along an original direction. The light source 202 can be any type of light-emitting device, such as a light-emitting diode or a laser diode. The mask plate 204 is positioned adjacent to the light source 202 to receive the beam of light from the light source. The mask plate 204 has an elongate aperture 216 to shape the beam of light into an elongate beam of light along the Y-direction. In this embodiment, the elongate aperture 216 is a narrow rectangular opening to shape the beam of light from the light source 202 into a narrow rectangular beam of light. However, in other embodiments, the elongate aperture 216 can have a different shape.

The encoder member 206 is positioned adjacent to the mask plate 204 to receive the beam of light from the light source 202 though the aperture 216 of the mask plate 204. In this embodiment, the encoder member 206 is configured as a rotary disk to be rotated about its center. However, in other embodiments, the encoder member 206 can be configured in any shape to be displaced in any direction. As shown in FIG. 2, the encoder member 206 has a diffractive channel 218 fabricated on a surface of a substrate 220. The diffractive channel 218 of the encoder member 206 includes tracks 212A and 212B of digital diffractive optic regions 214A and 214B, which are designed to optically manipulate an incident beam of light, as explained below. The substrate 220 of the encoder member 206 can be made of any material. As an example, the substrate 220 can be made of a plastic material, and the digital diffractive optic regions 214A and 214B on the tracks 212A and 212B of the diffractive channel 218 may be fabricated on the substrate surface. In this example, the encoder member 206 can be manufactured using conventional compact disc (CD) injection molding technology.

As shown in FIG. 2, the encoder member 206 includes an opening 222, which is designed to accommodate a rotating shaft. The shape and size of the opening 222 can vary depending on the rotating shaft for which the encoder member 206 is designed. As an example, the opening 222 of the encoder member 206 may be a circular opening to accommodate a cylindrical rotating shaft. In this embodiment, the diffractive channel 218 of the encoder member 206 is a circular band area about the center of the encoder member. Similarly, the tracks 212A and 212B of the diffractive channel 216 are concentric sub-band areas about the center of the encoder member 206. However, in other embodiments, the diffractive channel 218 and the tracks 212A and 212B may be non-circular band areas about the center of the encoder member 206, e.g., elliptical band areas.

Figure 4:
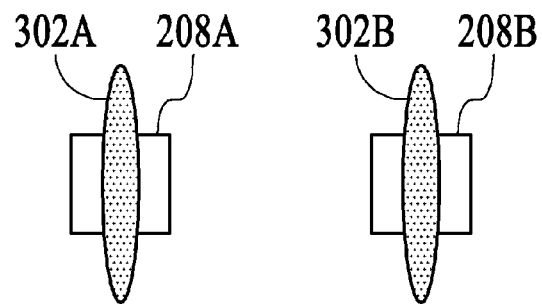
FIG. 4 illustrates spots of light on photodetectors included in the optical encoder of FIG. 2 in accordance with an embodiment of the invention.

The digital diffractive optic regions 214A and 214B of the encoder member 206 are small areas on the tracks 212A and 212B having optical properties to optically manipulate an incident beam of light. As shown in FIG. 2, the digital diffractive optic regions 214A and 214B may be configured as rectangular regions. In other embodiments, the digital diffractive optic regions 214A and 214B may be configured in other shapes, such as other polygonal or circular shapes. The digital diffractive optic regions 214A on the track 212A are configured to optically manipulate an incident beam of light traveling in the original propagating direction to a first modified propagating direction, as illustrated in FIG. 2. Similarly, the digital diffractive optic regions 214B on the track 212B are configured to optically manipulate an incident beam of light traveling in the original propagating direction to a second modified propagating direction, which differs from the first modified propagating direction, as illustrated in FIG. 2. In this embodiment, each digital diffractive optic region 214A or 214B of the encoder member 206 is further configured to shape the output beam of light into a bar-like beam of light in which the length of the output beam of light is at least twice as long as its width. In this embodiment, each digital diffractive optic region 214A or 214B is configured to shape the incident beam of light to a bar-like beam of light to produce an elongate oval spot of light 302A or 302B, as shown in FIG. 4. However, in other embodiments, each digital diffractive optic region 214A or 214B can be configured to produce a spot of light in any elongate configuration. The digital diffractive optic regions 214A and 214B of the encoder member 206 are positioned on the tracks 212A and 212B such that adjacent digital diffractive optic regions 214A or 214B along the track 212A or 212B are separate by a predefined distance, such as the width of the digital diffractive optic regions 214A and 214B. That is, each digital diffractive optic region 214A on the track 212A is separated from adjacent digital diffractive optic regions on the same track by some distance. Similarly, each digital diffractive optic region 214B on the track 212B is separated from adjacent digital diffractive optic regions on the same track by some distance. The spaces between adjacent digital diffractive optic regions 214A or 214B may be blank regions, i.e., unaltered regions of the encoder member substrate 220.

Figure 3:
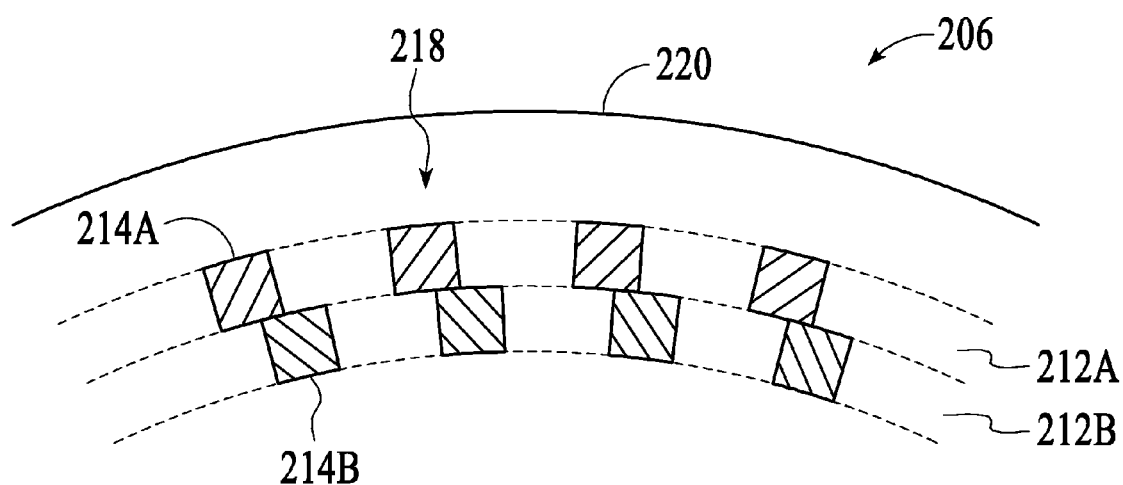
FIG. 3 is an enlarged partial view of an encoder member included in the optical encoder of FIG. 2 in accordance with an embodiment of the invention.

As best shown in FIG. 3, which is an enlarged partial view of the encoder member 206, the digital diffractive optic regions 214A on the track 212A are offset with respect to the digital diffractive optic regions 214B on the track 212B. In the embodiment shown in FIG. 3, the right edges of the digital diffractive optic regions 214A on the track 212A are positioned at the center of the digital diffractive optic regions 214B on the track 212B. Thus, the digital diffractive optic regions 214A are offset with respect to the digital diffractive optic regions 214B by half the width of the digital diffractive optic regions 214B. Alternatively, the positions of the digital diffractive optic regions 214A and 214B can be reversed so that the right edges of the digital diffractive optic regions 214B on the track 212B are positioned at the center of the digital diffractive optic regions 214A on the track 212A.

The digital diffractive optic regions 214A and 214B are diffractive optical elements with microstructures that optically manipulate an incident beam of light. The digital diffractive optic regions 214A and 214B are "digital" in the way that these regions are designed and fabricated. The digital diffractive optic regions 214A and 214B are designed with the aid of a digital computer using an analytical or numerical approach. The digital diffractive optic regions 214A and 214B are fabricated in a digital manner using binary photomasks and wafer lithography. Thus, the microstructures of the digital diffractive optic regions 214A and 214B are binary (single level) or multilevel microstructures. In contrast, a traditional analog holograms formed by exposing holographically a holographic plate with a laser include analog structures. The microstructures of the digital diffractive optic regions 214A and 214B are patterned to achieve the desired optical manipulations, such as beam shaping and beam redirecting. In an embodiment, the microstructures of the digital diffractive optic regions 214A and 214B are configured as linear grating microstructures. However, in other embodiments, the microstructures of the digital diffractive optic regions 214A and 214B may be configured in complex arrangements designed with the aid of a computer.

Turning back to FIG. 2, the optical detection system 207 is positioned adjacent to the encoder member 206 such that the encoder member is positioned between the light source 202 and the optical detection system. Thus, the optical detection system 207 is positioned on the opposite side of the encoder member 206 as the light source 202 to receive the beam of light transmitted through the encoder member. The optical detection system 207 includes a pair of photodetectors 208A and 208B, which are configured to generate electrical signals in response to received light. These electrical signals from the photodetectors 208A and 208B are transmitted to the processor 210, which uses the electrical signals to determine relative displacement information of the encoder member 206, such as rotational position, rotational speed and rotational direction. The photodetectors 208A and 208B can be any type of photodetectors, such as photodiodes, phototransistors or photoresistors. The photodetector 208A is positioned to receive beams of light manipulated by the computer-generated regions 214A on the track 212A of the encoder member 206, while the photodetector 208B is positioned to receive beams of light manipulated by the computer-generated regions 214B on the track 212B of the encoder member. Thus, the photodetector 214A is positioned along the first modified propagating direction, and the photodetector 214B is positioned along the second modified propagating direction.

In an alternative embodiment, the optical detection system 207 may be positioned on the same side of the encoder member 206 as the light source 202. In this alternative embodiment, the encoder member 206 is a reflective member such that the beam of light from the light source 202 is reflected off the computer-generated regions 214A and 214B toward the optical detection system 207.

The operation of the optical encoder is now described with reference to FIGS. 2-4. When the optical encoder 200 is powered up, the light source 202 is driven to generate a beam of light in the original propagating direction. The beam of light is then transmitted through the aperture 216 of the mask plate 204, which changes the beam of light to an elongate beam of light. The elongate beam of light then impinges upon both tracks 212A and 212B in the diffractive channel 218 of the encoder member 206. As the encoder member 206 is rotated, a portion of the elongate beam of light falls on the digital diffractive optic regions 214A or the spaces between the digital diffractive optic regions 214A. Similarly, a portion of the elongate beam of light falls on the digital diffractive optic regions 214B or the spaces between the digital diffractive optic regions 214B.

When a portion of the incident beam of light impinges on one of the digital diffractive optic regions 214A on the track 212A, that portion of the beam of light is optically manipulated by that digital diffractive optic region such that the beam of light is redirected from the original propagating direction to the first modified propagating direction toward the photodetector 208A of the optical detection system 207. In addition, the shape of the redirected beam of light is changed to a bar-like beam of light. This bar-like beam of light produces the spot of light 302A, which is detected by the photodetector 208A of the optical detection system 207, as illustrated in FIG. 4. The photodetector 208A then generates an electrical signal in response to the received beam of light.

Similarly, when a portion of the incident beam of light impinges on one of the digital diffractive optic regions 214B on the track 212B, that portion of the beam of light is optically manipulated by that digital diffractive optic region such that the beam of light is redirected from the original propagating direction to the second modified propagating direction toward the photodetector 208B of the optical detection system 207. In addition, the shape of this redirected beam of light is also changed to a bar-like beam of light. This bar-like beam of light produces the spot of light 302B, which is detected by the photodetector 208B of the optical detection system 207, as illustrated in FIG. 4. The photodetector 208B then generates an electrical signal in response to the received beam of light.

However, when a portion of the incident beam of light impinges on one of the spaces between the digital diffractive optic regions 214A or 214B, that portion of the beam of light is transmitted through the encoder member 206 without being optically manipulated so that the transmitted beam of light is not redirected in either the first or second modified propagation direction. Thus, this light beam portion is not received by either the photodetector 208A or the photodetector 208B of the optical detection system 207.

As the encoder member 206 is rotated, portions of the incident beam of light are intermittently transmitted through the digital diffractive optic regions 214A and 214B and directed to the photodetectors 208A and 208B, respectively. In response, the photodetectors 208A and 208B produce electrical signals in the shape of rectangular waves. Due to the offset positions of the digital diffractive optic regions 214A and 214B, the electrical signals produced by the photodetectors 208A and 208B are quadrature signals. These quadrature signals are processed by the processor 210 to determine relative displacement information of the encoder member 206.

Figure 5:
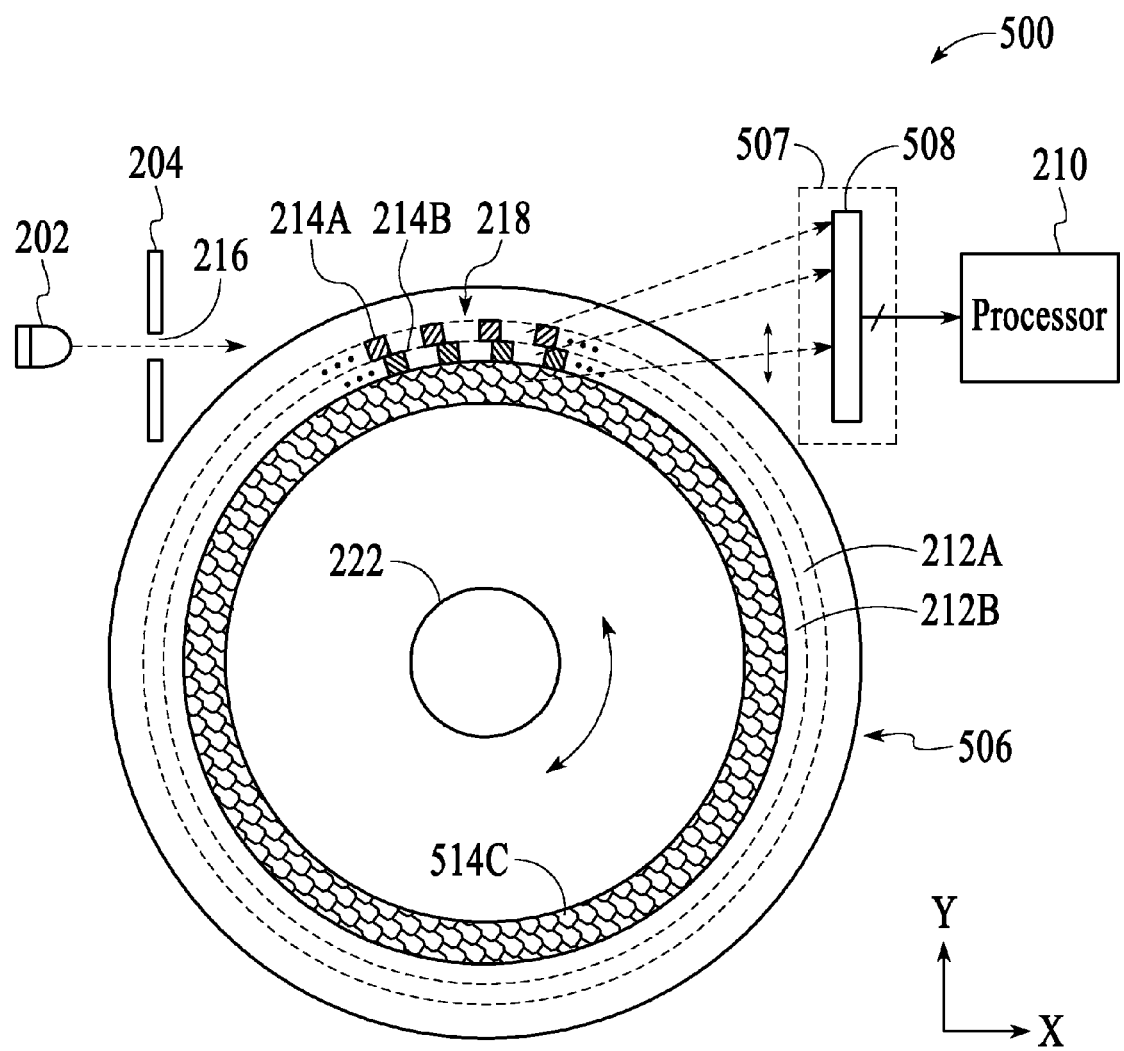
FIG. 5 is a diagram of an incremental optical encoder in accordance with another embodiment of the invention.
Figure 7A:
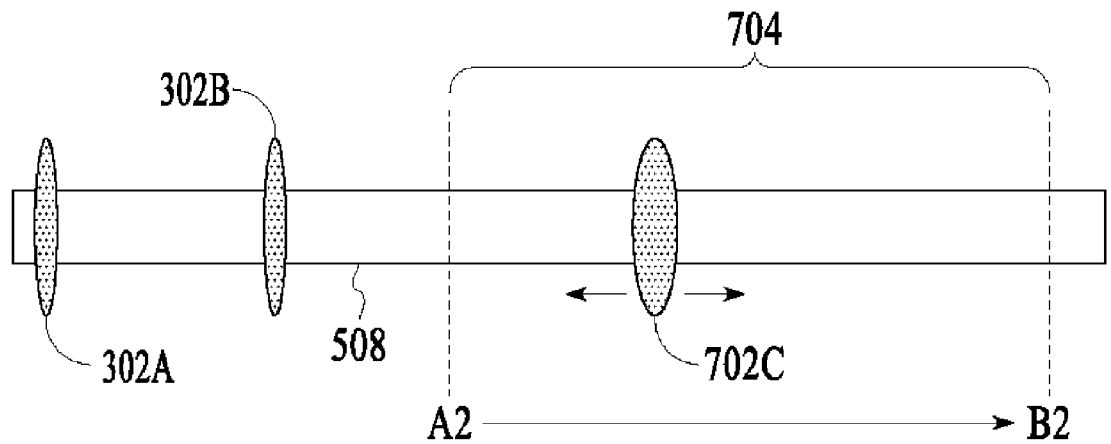
FIG. 7A illustrates static spots of light and a sweeping spot of light on a linear photodetector array included in the optical encoder of FIG. 5 in accordance with an embodiment of the invention.

Turning now to FIG. 5, an incremental optical encoder 500 in accordance with another embodiment of the invention is shown. The same reference numbers of FIG. 2 are used in FIG. 5 to indicate common elements. As shown in FIG. 5, the optical encoder 500 includes the light source 202, the mask plate 204, an encoder member 506 in the form of a circular disk, an optical detection system 507 and the processor 210. Similar to the encoder member 207 of the optical encoder 200 of FIG. 2, the encoder member 507 has the two tracks 212A and 212B of digital diffractive optic regions 214A and 214B in the diffractive channel 218. However, the diffractive channel 218 of the encoder member 507 further includes a digital diffractive optic track 512C. The digital diffractive optic track 514C may be an analytic-type digital diffractive optic or a numeric-type digital diffractive optic. Thus, the digital diffractive optic track 514C includes microstructures designed using an analytic or numeric approach. The digital diffractive optic track 514C is configured such that an incident beam of light is optically manipulated via diffraction so that the beam of light is redirected from the original propagating direction to one of various modified propagating directions within a predefined range. The specific modified propagating direction of the manipulated beam of light depends on where the original beam of light strikes the digital diffractive optic track 514C. In particular, the digital diffractive optic track 514C is configured such that the manipulated beam of light sweeps across the predefined range of modified propagating directions as the incident beam of light moves across the digital diffractive optic track due to the rotation of the encoder member 507. Similar to the digital diffractive optic regions 214A and 214B, the digital diffractive optic track 514C may be configured to shape the manipulated beam of light into a bar-like beam of light in which the length of the output beam of light is at least twice as long as its width. In this embodiment, the digital diffractive optic track 514C is configured to shape the incident beam of light to a bar-like beam of light to produce an elongate oval spot of light 702C, as shown in FIG. 7A. However, in other embodiments, the digital diffractive optic track 514C may be configured to shape the incident beam of light to a bar-like beam of light to produce a spot of light in any elongate configuration. The digital diffractive optic track 514C is further described below.

As illustrated in FIG. 5, the optical detection system 507 of the optical encoder 500 includes a linear detector array 508, which outputs electrical signals in response to received light. Similar to the optical detection system 207, the optical detection system 507 may be positioned on the same side or on the opposite side of the encoder member 506 as the light source 202, depending on whether the encoder member 507 is a transmissive or reflective member. The linear detector array 508 is positioned to receive the manipulated beams of light from the digital diffractive optic regions 214A and 214B and the digital diffractive optic track 514C of the encoder member 506. Since the propagating directions of the manipulated beams of light from the digital diffractive optic regions 214A and 214B do not change, these manipulated beams of light fall on the same locations of the linear detector array 508 as two static quadratic spots of light 302A and 302B, as illustrated in FIG. 7A. Thus, as the encoder member 506 is rotated, the static quadratic spots 302A and 302B will appear and disappear as the incident beam of light from the light source 202 intermittently impinges on the digital diffractive optic regions 214A and 214B of the encoder member 506 and the spaces between the digital diffractive optic regions.

The linear detector array 508 of the optical detection system 507 is also positioned to receive the manipulated beam of light from the digital diffractive optic track 514C of the encoder member 506 within a sweeping spot area 704 of the linear detector array as another spot of light 702C, as illustrated in FIG. 7A. However, since the propagating direction of the manipulated beam of light from the digital diffractive optic track 514C is dynamic, the manipulated beam of light falls on different locations of the sweeping spot area 704 of the linear detector array 508 as the incident beam of light from the light source 202 impinges on different locations of the digital diffractive optic track 514C due to the rotation of the encoder member 506.

Figure 6:
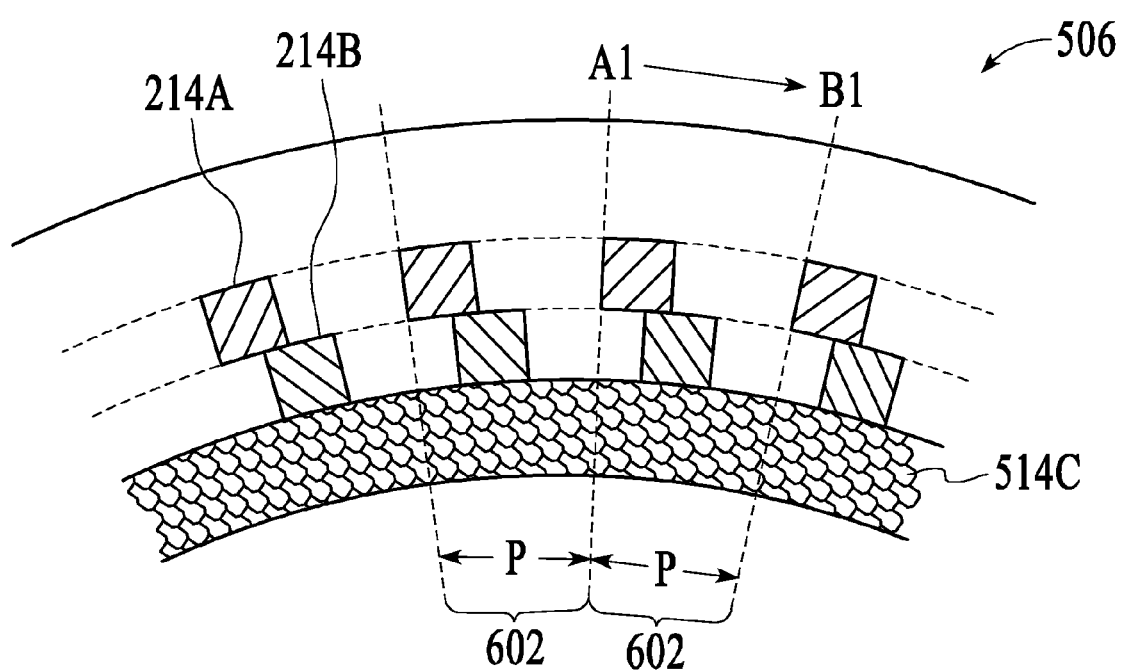
FIG. 6 is an enlarged partial view of an encoder member included in the optical encoder of FIG. 5 in accordance with an embodiment of the invention.

As illustrated in FIG. 6, the digital diffractive optic track 514C has periodic sections 602 in which each of the periodic sections has the same optical properties to manipulate an incident beam of light in the same manner in accordance with the position of the incident beam of light in a particular periodic section. The digital diffractive optic track 514C is configured to optically manipulate the incident beam of light such that the manipulated beam of light sweeps across the sweeping spot area 704 of the linear photodetector array 508 when the incident beam of light is correspondingly swept across one of the periodic sections 602 of the digital diffractive optic track 514C. As an example, as the incident beam of light is swept from the position A1 to the position B1, as illustrated in FIG. 6, the spot of light 702C produced by the manipulated beam of light from the digital diffractive optic track 514C is correspondingly swept from the position A2 to the position B2 of the sweeping spot area 704 of the linear photodetector array 508, as illustrated in FIG. 7A. When the incident beam of light crosses over to the next periodic section of the digital diffractive optic track 514C, the spot of light 702C produced by the manipulated beam of light from the digital diffractive optic track 514C jumps back to the position A2 of the sweeping spot area 704 of the linear photodetector array 508, and then is again swept toward the position B2 of the sweeping spot area. In response to the sweeping spot of light 702C, the linear photodetector array 508 generates electrical signals that indicate the position and the sweeping direction of the spot of light 702C on the sweeping spot area 704 of the linear photodetector array. Thus, the position of the spot of light 702C on the sweeping spot area 704 of the linear photodetector array 508 can be used to determine the rotational position of the encoder member 506 in much higher resolution than the positional information derived from just the two quadratic spots of light 302A and 302B. Furthermore, the sweeping direction of the sweeping spot of light 702C on the sweeping spot area 704 can be used to determine the rotational direction of the encoder member 506. The electrical signals generated by the linear photodetector array 508 for the spots of light 302A, 302B and 702C are transmitted to the processor 210, which processes the electrical signals to determine relative displacement information of the encoder member 506.

In an alternative embodiment, the optical detection system 507 of the optical encoder 500 may further include two photodetectors, such as the photodetectors 208A and 208B of the optical detection system 207. In this embodiment, the two photodetectors of the optical detection system 507 are used exclusively to detect the static spots of light 302A and 302B, while the linear photodetector array 508 is used exclusively to detect the sweeping spot of light 702C. In another alternative embodiment, the encoder member 506 may only include the digital diffractive optic track 514C. That is, the digital diffractive optic regions 514A and 514B may be eliminated from the encoder member 506. Even without the quadrature signals derived from the digital diffractive optic regions 514A and 514B of the encoder member 506, the electrical signals derived from the digital diffractive optic track 514C can provide sufficient data to determine relative displacement information of the encoder member 506.

Figure 7B:
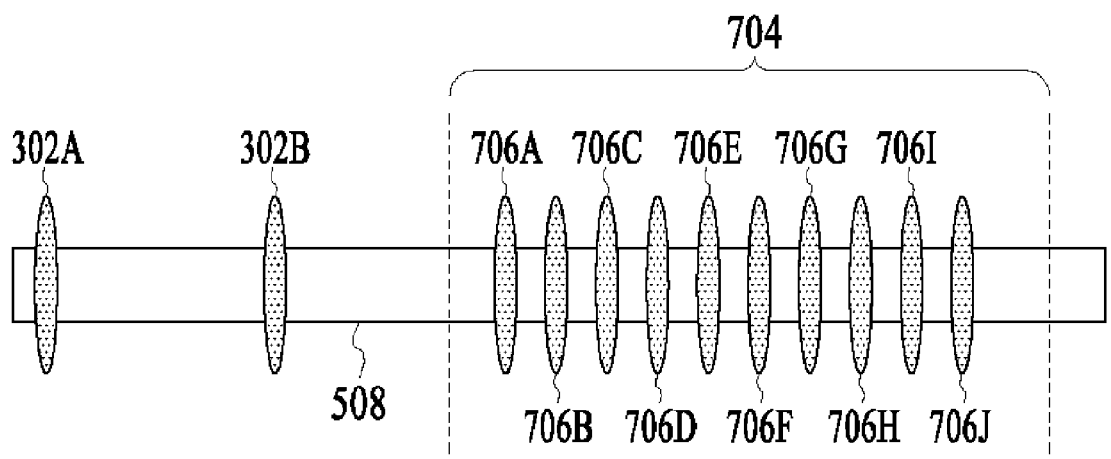
FIG. 7B illustrates spots of light, including a number of spots of light that indicates a position of an encoder member of the optical encoder of FIG. 5, on the linear photodetector array of the optical encoder of FIG. 5 in accordance with an embodiment of the invention.

In another alternative embodiment, the digital diffractive optic track 514C of the encoder member 506 is configured to optically manipulate the incident beam of light into diffractively manipulated beams of light, which are detected by the linear photodetector array 508 as spots of light on the linear photodetector array, such as the spots of light 706A-706J illustrated in FIG. 7B. The digital diffractive optic track 514C is configured such that the produced combination of the spots of light 706A-706J depends on the position of the incident beam of light on the diffractive optic track. In this embodiment, each spot of light on a particular location in the region 704 of the linear photodetector array 508 may represent a digital bit. As an example, a spot of light at a specific location in the region 704 of the linear photodetector array 508 may represent a digital value of "1", while an absence of a spot of light at the specific location in the region 704 of the linear photodetector array 508 may represent a digital value of "0". Thus, a combination of the spots of light 706A-706J produced by the digital diffractive optic track 514C can represent a digital absolute position value, which indicates the precise location of the beam of light from the light source 202 incident on the digital diffractive optic track 514C of the encoder member 506. Thus, the digital diffractive optic track 514C is configured to optically manipulate an incident beam of light into one of different combinations of manipulated beams of light to produce a corresponding combination of spots of lights on the linear photodetector array 508, where each combination of manipulated beams of light depends on the location of the incident beam of light on the diffractive optic track. As used herein, a combination of manipulated beams of light means a combination of manipulated beams that produces a specific pattern of spots of light on the linearly photodetector array 508. As an example, one combination of manipulated beams of light may be manipulated beams of light that produce only the spots of light 706A, 706B, 706D, 706G, 706H, 706I and 706J on the linearly photodetector array 508. Thus, in this example, the spots of light 706C, 706E and 706F are absent. Other combinations of manipulated beams of light will produce only some of the spots of light 706A-706J on the linearly photodetector array 508.

In some implementations, the digital diffractive optic track 514C may be configured to always produce the spots of the light 706A and 706J, which are used for calibration. In these implementations, the digital absolute position value is represented by the combination of the spots of lights 706B-706I produced by the digital diffractive optic track 514C.

In one implementation, the digital diffractive optic track 514C of the encoder member 506 is configured such that, as the incident beam of light is swept from the position A1 to the position B1 on the encoder member, as illustrated in FIG. 6, different combinations of the spots of light 706A-706J are produced by the digital diffractive optic track that correspond to the location of the incident beam of light between the position A1 and the position B1. Thus, the precise location of the incident beam of light on the digital diffractive optic track 514C between the position A1 and the position B1 can be determined by the particular combination of the spots of light 706A-706J produced by the digital diffractive optic track. The different combinations of the spots of light 706A-706J are repeated for each periodic section 602 of the digital diffractive optic track 514C.

In another implementation, the digital diffractive optic track 514C of the encoder member 506 is configured such that a unique combination of the spots of light 706A-706J is produced by the digital diffractive optic track for each location along the digital diffractive optic track 514C. Thus, the precise location of the incident beam of light anywhere on the digital diffractive optic track 514C can be determined by the unique combinations of the spots of light 706A-706J produced by the digital diffractive optic track. The exact number of combinations of the spots of light 706A-706J produced by the digital diffractive optic track 514C depends on the resolution of the incremental optical encoder 500. In this implementation, since the digital diffractive optic track 514C provides an absolute position value for any position of the encoder member 506, the two spots of light 302A and 302B are not needed. Thus, in some embodiments, the encoder member 506 may include only the digital diffractive optic track 514C, i.e., the encoder member 506 does not include the digital diffractive optic regions 214A and 214B.

Figure 8:
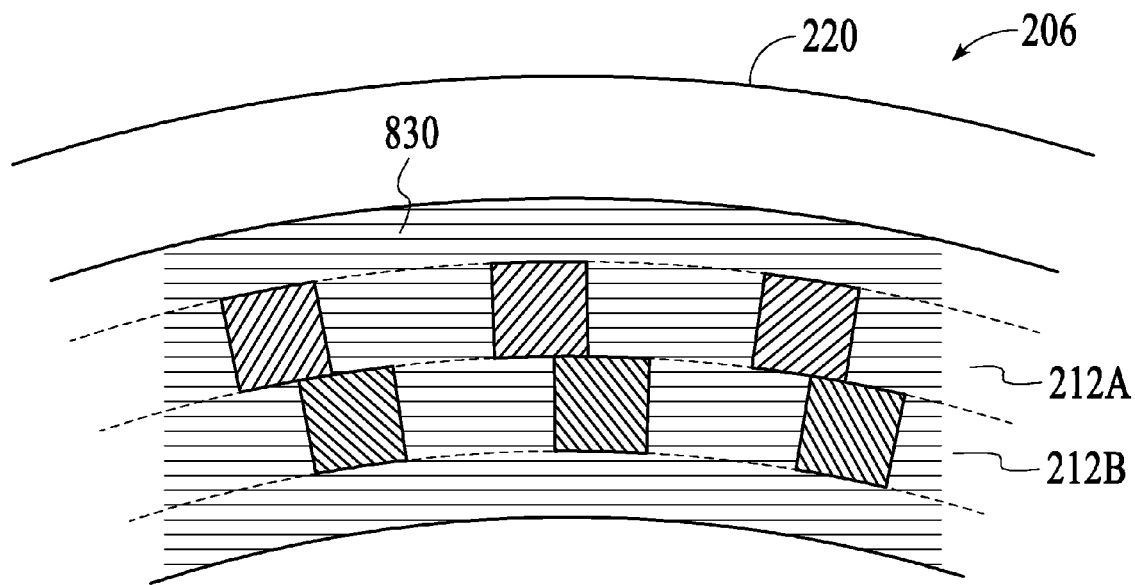
FIG. 8 is an enlarged partial view of the encoder member of the optical encoder of FIG. 1 with a diffractive grating in spaces between digital diffractive optic regions of the encoder member in accordance with an embodiment of the invention.

The optical encoders 200 and 500 may be optimized using one or both of the following two techniques. The first optimization technique is described with reference to the optical encoder 200. However, this optimization technique can also be applied to the optical encoder 500. The first optimization technique involves introducing a diffractive grating 830 in the spaces within the tracks 212A and 212B between the digital diffractive optic regions 214A and 214B of the encoder member 106, as illustrated in FIG. 8. As shown in FIG. 8, the diffractive grating 830 may also extend beyond the tracks 212A and 212B. The diffractive grating 830 is configured to diffract portions of the incident beam of light from the elongate aperture 216 of the mask plate 204 away from the photodetectors 208A and 208B to prevent SNR decrease due to the light transmitted through the spaces surrounding the digital diffractive optic regions 214A and 214B. In an embodiment, the diffractive grating 830 is a digital diffractive optic element with microstructures, which may be linear grating microstructures.

The second optimization technique involves modifying the digital diffractive optic regions 214A and 214B of the encoder member 206 or 506 to compensate for changes in angle between the beam of light from the light source 202, which is fixed and non-moving, and the linear grating microstructures of the digital diffractive optic regions 214A and 214B, which is rotating due to the rotation of the encoder member 106. These angle changes cause the spots of light 302A and 302B, as illustrated in FIG. 4, to shift about the photodetectors 208A and 208B as encoder member 206 or 506 with the digital diffractive optic regions 214A and 214B is rotated. When the angle change is significant, e.g., when the digital diffractive optic region 214A or 214B is far away from the center of the incident beam of light, the spot of light produced by the diffracted light from that digital diffractive optic region may drift toward the edge of the photodetector 208A or 208B, which may result in a weak signal from that photodetector. However, by modifying the digital diffractive optic regions 214A and 214B so that the gratings of the digital diffractive optic regions 214A and 214B are configured to compensate for these changes in angle, the spots of light produced by the diffracted light from the digital diffractive optic regions 214A and 214B can be made to fall near the center of the photodetectors 208A and 208B regardless of the angle changes due to rotation, which will result in stronger signals from photodetectors 208A and 208B.

Figure 9:
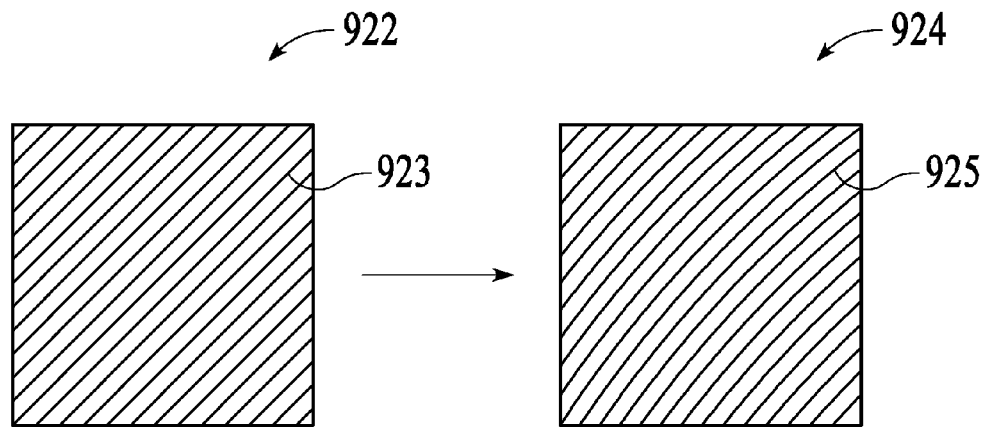
FIG. 9 illustrates a modification of a digital diffractive optic region from a region with linear grating microstructures to a region with curved grating microstructures to compensate for changes in angle between an incident beam of light and the digital diffractive optic region due to rotation in accordance with an embodiment of the invention.

In an embodiment, the digital diffractive optic regions 214A and 214B are modified to compensate for changes in angle between the incident beam of light and the digital diffractive optic regions 214A and 214B due to rotation by making the grating microstructures of the digital diffractive optic regions 214A and 214B into curved grating microstructures. Such modification is illustrated in FIG. 9. An unmodified digital diffractive optic region 922 with linear grating microstructures 923 is shown on the left. A modified digital diffractive optic region 924 with curved grating microstructures 925 is shown on the right. In FIG. 9, the curved grating microstructures 925 of the digital diffractive optic region 924 are shown to merely illustrate that the grating microstructures 925 are curved. The actual curvature and orientation of the curved grating microstructures 925 of the digital diffractive optic region 924 will differ in the actual implementation.

A fabrication process of the encoder members 206 and 506 of the optical encoders 200 and 500 in accordance with an embodiment of the invention is now described. First, a mask layout of the microstructures of the digital diffractive optic regions 214A and 214B and/or the digital diffractive optic track 514C is designed. The mask layout design can be achieved using an analytical or numerical approach with the aid of a computer. Next, a photomask is produced using the mask layout design. Using the photomask, a master encoder member is produce via photolithographic and etching processes. In this embodiment, a silicon disk is used to produce the master encoder member. Next, the master encoder member is used to produce the encoder member 206 or 506 using, for example, embossing, casting or CD injection molding technology. In this fashion, the encoder members 206 and 506 can be mass fabricated in a cost effective manner.

In other embodiments, different techniques can be used to produce the master encoder member. These techniques include:

1) Standard CD authoring via laser patterning similar to conventional audio CD master recording on photo-resist covered plate with laser exposure;
2) Successive holographic exposure of an index modulation or surface relief (photoresist) material; and
3) Other exotic lithographic techniques including direct e-beam write, focused ion beam microstructuring, excimer laser micro ablation, fast atom beam exposure, deep proton irradiation, gray scale lithography technologies, etc.

Furthermore, in other embodiments, the master encoder member (as a surface relief element or an index modulation element) may be replicated by successive parallel holographic exposure.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical encoder comprising:
   a light source configured to generate a beam of light along an original propagating direction;
   an encoder member positioned to receive said beam of light from said light source, said encoder member including a digital diffractive optic track, and first and second tracks, said digital diffractive optic track being configured to optically manipulate said beam of light into a particular combination of manipulated beams of light from a plurality of combinations of manipulated beams of light as said encoder member is displaced with respect to said light source, each of said combinations of manipulated beams of light representing a position of said beam of light on said digital diffractive optic track, said first track including a plurality of first digital diffractive optic regions, each of said first digital diffractive optic regions being separated from adjacent first digital diffractive optic regions by some distance, each of said first digital diffractive optic regions being configured to optically manipulate said beam of light from said original propagating direction to a first modified propagating direction, said second track including a plurality of second digital diffractive optic regions, each of said second digital diffractive optic regions being separated from adjacent second digital diffractive optic regions by some distance, each of said second digital diffractive optic regions being configured to optically manipulate said beam of light from said original propagating direction to a second modified propagating direction, wherein said first and second digital diffractive optic regions are positioned on said encoder member such that said first digital diffractive optic regions are offset with respect to said second digital diffractive optic regions such that said first digital diffractive optic regions are offset by half the width of said second digital diffractive optic regions; and
   an optical detection system positioned to receive and detect said manipulated beams of light from said digital diffractive optic track of said encoder member as spots of light that represent a digital absolute position value of said encoder member.

2. The encoder of claim 1 wherein spaces between said first digital diffractive optic regions and said second digital diffractive optic regions include a diffraction grating that is configured to diffract said beam of light away from said optical detection system.

3. The encoder of claim 1 wherein said first and second digital diffractive optic regions include curved grating microstructures to compensate for changes in angle between said beam of light and said first and second digital diffractive optic region as said an encoder member is rotated.

4. The encoder of claim 1 wherein said encoder member is made of a plastic material and said digital diffractive optic track is formed on said plastic material.

5. The encoder of claim 1 wherein said encoder member is a circular disk and said digital diffractive optic track is a circular track around the center of said circular disk.

6. The encoder of claim 1 wherein said digital diffractive optic track is configured to shape said manipulated beams of light into bar-like beams of light to produce bar-like spots of light.

7. The encoder of claim 1 wherein said optical detection system comprises a photodetector array positioned to receive said manipulated beams of light from said digital diffractive optic track.

8. An encoder member for an optical encoder comprising:
   a substrate;
   a digital diffractive optic track on the substrate, said digital diffractive optic track being configured to optically manipulate an incident beam of light into a particular combination of manipulated beams of light from a plurality of combinations of manipulated beams of light, each of said combinations of manipulated beams of light representing a position of said incident beam of light on said digital diffractive optic track;
   a first track on the substrate, said first track including a plurality of first digital diffractive optic regions on said substrate, each of said first digital diffractive optic regions being separated from adjacent first digital diffractive optic regions by some distance, each of said first digital diffractive optic regions being configured to optically manipulate said beam of light from said original propagating direction to a first modified propagating direction; and
   a second track on the substrate, said second track including a plurality of second digital diffractive optic regions on said substrate, each of said second digital diffractive optic regions being separated from adjacent second digital diffractive optic regions by some distance, each of said second digital diffractive optic regions being configured to optically manipulate said beam of light from said original propagating direction to a second modified propagating direction,
   wherein said first and second digital diffractive optic regions are positioned on said encoder member such that said first digital diffractive optic regions are offset with respect to said second digital diffractive optic regions such that said first digital diffractive optic regions are offset by half the width of said second digital diffractive optic regions.

9. The encoder member of claim 8 wherein spaces between said first digital diffractive optic regions and said second digital diffractive optic regions include a diffraction grating that is configured to diffract said beam of light away from said optical detection system.

10. The encoder member of claim 8 wherein said first and second digital diffractive optic regions include curved grating microstructures to compensate for changes in angle between said beam of light and said first and second digital diffractive optic region as said an encoder member is rotated.

11. The encoder member of claim 8 wherein said substrate is made of a plastic material and said digital diffractive optic track is formed on said plastic material.

12. The encoder member of claim 8 where said substrate is a circular disk and said digital diffractive optic track is a circular track around the center of said circular disk.

* * * * *